United States Patent [19]
Carney

[11] Patent Number: 5,738,595
[45] Date of Patent: Apr. 14, 1998

[54] LASER AIMING DEVICE

[76] Inventor: William P. Carney, 4 High Ridge La., Oyster Bay, N.Y. 11771

[21] Appl. No.: 625,237

[22] Filed: Apr. 1, 1996

Related U.S. Application Data

[63] Continuation-in-part of Ser. No. 572,867, Dec. 14, 1995, which is a continuation-in-part of Ser. No. 543,442, Oct. 16, 1995, Pat. No. 5,611,739.

[51] Int. Cl.$^6$ .............. A63B 69/36; G01C 5/00; A63D 15/08; F21K 7/00
[52] U.S. Cl. .............. 473/209; 473/2; 473/211; 473/220; 362/259; 33/290; 33/354; 33/379
[58] Field of Search .............. 473/220, 2, 211; 362/109, 259; 352/74; 33/290, 354, 379

[56] References Cited

U.S. PATENT DOCUMENTS

| | | | |
|---|---|---|---|
| 4,688,796 | 8/1987 | Wright | 362/109 X |
| 5,121,188 | 6/1992 | Patridge et al. | 352/74 |
| 5,207,429 | 5/1993 | Walmsley et al. | 473/220 |
| 5,367,779 | 11/1994 | Lee | 33/290 |

*Primary Examiner*—George J. Marlo
*Attorney, Agent, or Firm*—Charles E. Temko

[57] ABSTRACT

Adapters removably affixing a hand held laser pointer to selected apparatus are disclosed. The adapters include structure for mounting therein the laser pointer having a laser module emitting a laser beam, a casing, a voltage source and a switch for controlling the laser module. Also included is a device for maintaining the laser pointer in an on condition and means for removably affixing the adapters to the selected apparatus such that when the adapters are affixed thereon, the laser beam emitted from the laser pointer is aimed in a predetermined relation with respect to the selected apparatus. The laser pointer and associated adapters are employed to optimize the use of the laser pointer and enhance the selected apparatus upon which it is mounted.

15 Claims, 8 Drawing Sheets

LASER AIMING DEVICE

CROSS REFERENCE TO RELATED APPLICATIONS

This is a continuation-in-part of my U.S. patent application Ser. No. 08/572,867 filed Dec. 14, 1995 which is a continuation-in-part of my U.S. patent application Ser. No. 08/543,442 filed Oct. 16, 1995, Now U.S. Pat. No. 5,611,739, dated Mar. 18, 1997.

BACKGROUND OF THE INVENTION

1. Field of the Invention

This invention relates to laser pointers and more particularly to adapters in which a self-contained laser pointer may be mounted to project a laser beam in a predetermined relation with respect to various apparatus upon which the adapters and associated laser pointer are affixed.

2. Description of Related Art

Self-contained, hand held laser devices which generate a laser beam for use as a pointer are well known in the art and widely used in numerous applications. Typically, a hand held pointer is designed to look like a writing pen and may include a pocket clip for securing the pen-like device in a shirt pocket. Some pointers utilize the pocket clip as a switch to turn the laser on, others use a miniature button switch. In either case, in the industry, it is considered advantageous if the hand held laser is turned on by a normally open switch that is held closed by a user during the time he or she desires the laser beam to be emitted. Self-contained laser beam generators of this type are produced in substantial quantities to meet a well established demand for hand held pointer applications.

Typically, persons having needs for hand held laser pointers also have needs for other types of laser aiming devices. To satisfy these needs and to provide the user flexibility and cost effectiveness, there is a requirement for a mounting arrangement to interchangeably affix the user's hand held pointer on any one of a number of apparatus which may be enhanced by providing an appropriate laser aiming device for mounting thereon. Further, there is a need for an aiming device employing a pointer wherein the user does not have to hold the normally open switch on the pointer closed in order to activate the laser while it is being employed to aim selected apparatus.

The following United States patents show prior art laser devices to which the present invention is applicable:

A known United States patent application, Laser Pointer for Use in Golf Training, discloses a novel means for interchangeably mounting a self-contained laser pointer either on the head of a golf club putter or on a golf cap in order to enhance the practice of golf. When mounted on the head of the putter, the disclosed device provides a laser alignment beam for aiming the putter. When mounted on the golf cap, the device provides a laser alignment beam for monitoring and analyzing the body motion of a golfer during his or her golf swing. This application does not, however, disclose a means by which the self-contained laser pointer may be mounted on apparatus other than apparatus relating to golf.

U.S. Pat. No. 5,367,779 which issued to Roger Lee on Nov. 29, 1994, teaches a battery powered laser beam source adjustably affixed to a level for projecting a reference laser beam therefrom. As taught by Lee, a typical use for his device includes providing a carpenter with a laser reference line on a workpiece. Lee does not disclose a self-contained laser pointer which may be removably affixed to the air bubble level apparatus of his disclosure and which may alternatively be mounted on other selected apparatus.

U.S. Pat. No. 5,121,188 which issued on Jun. 9, 1992, to William C. Patridge, discloses a self-contained laser module assembly including one application of the module in a pen-like pointer. The pointer has a normally open pocket clip switch through which electrical contact is selectably made between the body of the pointer and a side contact on the module to cause a beam to be emitted. This disclosure, however, does not teach a means by which the pen-like pointer may be adapted to interchangeably mount on a variety of different selected apparatus thereby providing additional uses for the pointer and the selected apparatus upon which it is affixed.

U.S. Pat. No. 4,688,796 which issued on Aug. 25, 1987 to Fred Wright discloses a pool cue provided with a switch-accuatable generator for causing a narrow collimated beam of light to emerge from the playing tip along the longitudinal axis of the cue. In the preferred embodiment, a laser generator is positioned within the handle portion of the cue and the light therefrom moves through a longitudinal bore along the length of the cue from an apertured standard playing tip thereby providing a reference beam for aiming the cue. Wright, however, does not disclose a means for interchangeably mounting the laser module of his disclosure on other selected apparatus.

In the above mentioned prior art laser aiming devices, laser sources are disclosed for use in combination with a variety of apparatus such as golf clubs, golf caps, levels and pool cues. It is generally accepted that the laser source is a substantial portion of the cost of these types of laser aiming devices. As can be seen from the foregoing, there is a definite need for a universal mounting arrangement which can interchangeably affix a hand held laser pointer on any one of a number of apparatus whose use may be optimized by employing a laser aiming device thereon. This type of mounting arrangement would enable the purchaser of the hand held laser pointer to use it not only as a hand held pointer but also to use it in combination with a variety of laser aimed apparatus at relatively little additional cost.

SUMMARY OF THE INVENTION

The present invention overcomes the above described problems and disadvantages and provides laser mounting arrangements which may be employed to removably affix a self-contained, pen-like laser pointer on a variety of selected apparatus so as to provide flexibility in the utilization of the relatively costly laser emitter.

In a first embodiment, a laser device projecting an alignment beam comprises a self-contained laser pointer including a laser module emitting a laser beam, a casing, a power source and a normally open switch having an on position and an off position controlling the laser module. In addition, the laser device comprises an adapter in which the laser pointer is removably affixed. Also, included in the laser device are means for maintaining the laser pointer in the on position and means for affixing the adapter on selected apparatus such that when the laser pointer is installed on the adapter the laser beam emitted therefrom is projected in a predetermined direction with respect to the selected apparatus.

In a second embodiment a laser device projecting an alignment beam comprises a self-contained laser pointer including a laser module emitting a laser beam, a casing, a power source and a switch controlling the laser module. In addition, the laser device includes a plurality of support members wherein each support member defines a first means for mounting and aligning each support member on an associated selected apparatus and each support member has a second means for affixing the laser pointer thereon such that when each support member is affixed to the associated selected apparatus and the pointer is affixed on the support member, the laser beam is projected in a predetermined direction with respect to the associated selected apparatus.

In a third embodiment, a laser device projecting an alignment beam comprises a self-contained laser pointer including a laser module emitting a laser beam, a casing, a power source and a normally open switch having an on position and an off position controlling the laser module. In addition, the laser device comprises a pointer enclosure having a bore in which the laser pointer is removably affixed such that the laser beam is emitted through an opening in the bore. Also, included in the device are means for maintaining the laser pointer in the on position and a support member forming first and second alignment means wherein the first alignment means affixes and aligns the support member on selected apparatus and the second alignment means removably affixes and aligns the pointer enclosure on the support member. The pointer enclosure and the support member are mutually aligned such that when the pointer is installed in the pointer enclosure, the laser beam emitted therefrom is aimed in a predetermined direction with respect to the selected apparatus.

DETAILED DESCRIPTION OF THE INVENTION

Figures 1, 2:
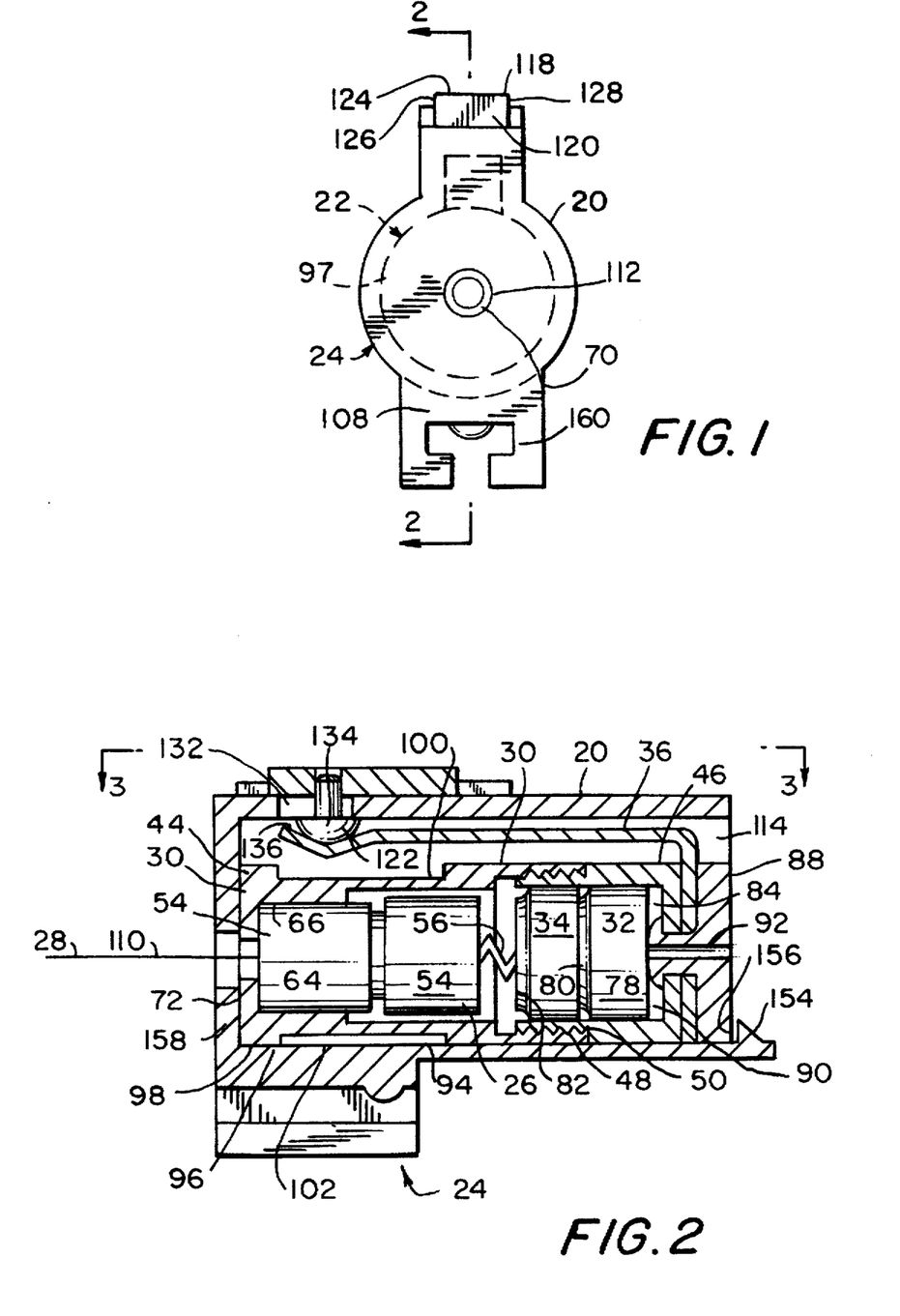
FIG. 1 is a front elevation of a pointer enclosure having mounted therein a self-contained, pen-like laser pointer.
FIG. 2 is a sectional view of the pointer enclosure and the laser pointer contained therein shown in FIG. 1 taken along lines 2—2.

Turning now to the drawings, there is shown in FIGS. 1 and 2 a first embodiment of the present invention which comprises an adapter generally referred to by reference number 24 which includes a pointer enclosure 20 having mounted therein a self-contained, pen-like laser pointer, suitable for use as a hand held device, generally referred to by reference number 22. Included as components of the laser pointer are a laser module 26 emitting a laser beam 28, a casing 30, a voltage source 32 comprising at least one battery 34 and a normally open pocket clip switch 36 having an on position and an off position, illustrated in FIG. 2 in its normally open or off position.

The casing 30 comprises a generally cylindrical body portion 44 and a generally cylindrical cap portion 46 wherein the body portion 44 is preferably manufactured from an electrically conductive metallic alloy such as brass or aluminum and the cap portion 46 is formed from an electrically insulative material such as any one of a number of commercially available plastic resins. The body portion 44 and the cap portion 46 are affixed to each other by threaded engagement wherein the body portion 44 is formed with an internally threaded section 48 which engages an externally threaded section 50 formed in the cap portion 46.

Mounted in the body portion 44 is the laser module 26 which may be purchased as a component having a first conductive terminal, preferably a generally cylindrical shell 54, and having a second conductive terminal, preferably a spring member 56. The shell 54 and the spring member 56 are used to couple first and second poles, opposite polarity electrical potentials, from the voltage source 32 to energize the laser module 26 wherein, preferably, the cylindrical shell 54 is a positive terminal and the spring member 56 is a negative terminal. Available from any one of a number of vendors such as Lyte Optronics, Santa Monica, Calif., the laser module 26 fits snugly into and makes electrical contact with a generally cylindrical internal surface 64 of a module bore 66 thereby aligning the laser module 26 so that it projects its laser beam 28 through an opening 70 in a front side 72 of the body portion 44.

Mounted in the cap portion 46 is the voltage source 32 comprising a series connection of the disc shaped batteries 34 which may be obtained from the Duracell Corp., a well known provider of the 1.5 volt micro alkaline batteries shown in FIG. 2. Each battery 34 has an outer portion which defines a positive pole 78 and a centrally disposed axially extending central portion which defines a negative pole 80. A negative termination 82 of the voltage source 32 contacts the spring member 56 which, as mentioned above, is the negative terminal of the laser module 26.

A generally cylindrical end cap 88 affixes the pocket clip switch 36, manufactured from an electrically conductive resilient material such as brass or phosphor bronze, to the cap portion 46. The end cap 88 is made from a conductive material such as brass or aluminum and electrically connects the pocket clip 36 to a positive termination 84, of the voltage source 32. When employed as a hand held pointer, a user turns the laser beam 28 on by depressing and holding closed the pocket clip 36 such that it contacts the conductive body portion 44 thereby completing the electrical circuit between the laser module 26 and the voltage source 32.

Unlike the prior art, the laser pointer 22 of the present invention includes the insulative cap portion 46 wherein the batteries 34 are mounted rather than in a conductive portion of a prior art casing. Because the cap portion 46 of the present invention is itself formed from an insulative material, an insulative coating or an insulating sleeve is not needed, as in the prior art, to isolate the positive poles 78 of the batteries 34 from the cap portion 46 thereby minimizing the number of components and/or operations required to manufacture the casing 30.

Further, unlike the prior art, the cap portion 46 offers the user a shallow cap bore 90 in which only the batteries 34 are mounted and in which the batteries 34 are easily removed and replaced. Prior art cavities are typically close fitting deeper bores in which it is difficult to maintain the alignment of disc-like batteries 34 when removing or installing them. In addition, a relatively small access opening 92 may be provided in the cap portion 46 so that a misaligned and jamed battery 34 may be pushed out by, for example, a straightened paper clip inserted in the access opening 92.

In the industry, it is considered advantageous that the laser beam 28 of the hand held pointer 22 is activated by the normally open switch 36 which is held closed by the user to ensure that the laser beam 28 is not inadvertently left on, perhaps, exposing someone to laser radiation. Further, it is considered advantageous that a laser warning label 94 be affixed on the hand held laser pointer 22 to caution the user regarding the hazards of laser radiation. As explained in more detail below, the laser pointer 22 of the present invention may be mounted in the adapter 24 having included therein an alignment bore 96. Therefore, there is formed in the outside surface of the casing 30 a generally cylindrical first section 98 for snugly fitting into the alignment bore 96 and a generally cylindrical second section 100 formed to have affixed thereon the above mentioned warning label 94 such that when the laser pointer is fully inserted in the pointer enclosure 20, the label 94 does not contact an inside surface 102 of the alignment bore 96 and effect the alignment of the casing 30 in the alignment bore 96.

Figure 2A:
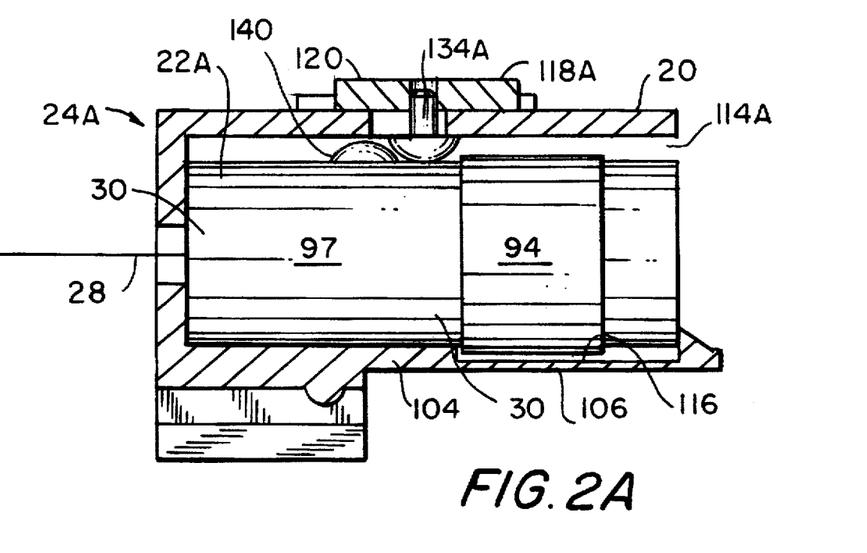
FIG. 2A illustrates an alternate embodiment of the pointer enclosure and the laser pointer shown in FIG. 2.

Alternatively, as shown in FIG. 2A, the casing 30 may be formed with a generally cylindrical outside surface 97 having the label 94 affixed thereon. In addition, the pointer enclosure 20 may be formed with two bore sections therein, a first bore section 104 formed to receive and align the casing 30 and a second bore section 106 formed slightly larger than the first bore section 104 in a location to accommodate the warning label 94 so that when the laser pointer is fully inserted in the pointer housing 20, the warning label 94 does not contact the inside surface 116 of the second bore section 106 and thereby effect the alignment of the casing 30 the first bore section 104.

As mentioned above, if a typical pen-like laser pointer is to be adapted for use as an aiming device on selected apparatus, there is a need for providing not only a means for mounting and aligning the pen-like pointer on the apparatus but also a means for maintaining the pen-like pointer in the on position while it is being employed to provide an aiming beam. Described below are novel and cost effective means for providing the aforementioned functions which comprise adapters for mounting and aligning the pointer on selected apparatus and switch arrangements for maintaining the pointer in the on position. It is to be understood that there are various other mounting and switch arrangements, however, for the sake of brevity, only a representative sample are described in detail below.

The adapter 24 shown in FIGS. 1 and 2 is used to removably affix the laser pointer 22 on selected apparatus and is preferably molded from any one of a number of plastic resins having formed therein, with substantial precision, the alignment bore 96 which receives and aligns the laser pointer 22 therein such that the laser beam 28 is emitted through an opening 112 in a front face 108 of the pointer enclosure 20 coincident with the axis 110 of the alignment bore 96. Communicating with the alignment bore 96 is a channel 114 in which the pocket clip switch 36 is operated by a cam switch 118 located adjacent the channel 114 and which is adapted to be activated by a user's finger to maintain the laser pointer 22 in its on position.

Figure 3:
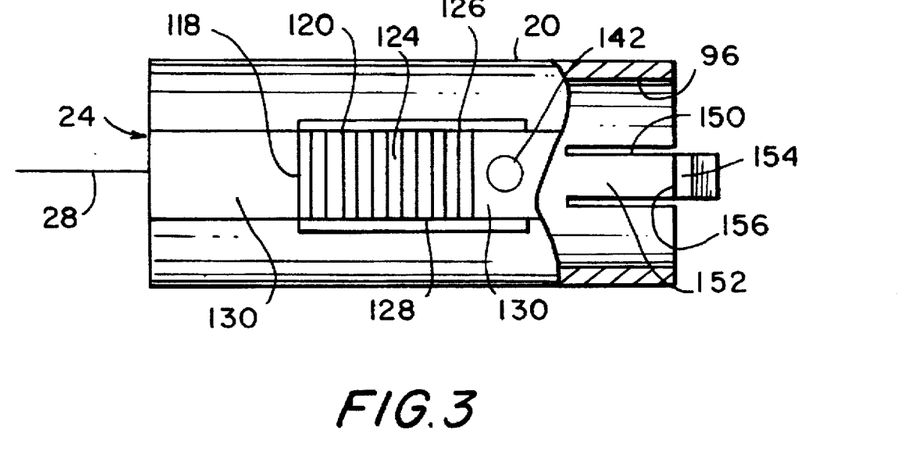
FIG. 3 is a partial sectional view of the pointer enclosure shown in FIG. 2 taken along the lines 3—3.

Referring now to FIGS. 1,2 and 3,the cam switch 118 comprises a slide element 120, preferably fabricated from a plastic resin, and a cam element 122 which may be formed from either a metallic alloy or a resinous plastic material using known manufacturing processes. The slide element 120 has a serrated top surface 124 and first 126 and second 128 laterally extending parallel sides which fit slidably in a guideway 130 formed in the pointer enclosure 20. Also, formed in the pointer enclosure 20 is a guide slot 132 in which the cam element 122 is guided and affixed therein by a head 134 formed on the cam element 122 which contacts the pocket clip switch 36 in the channel 114. When the slide element 120 is moved forward from its off position to turn on the laser pointer 22, the head 134 engages a cam surface 136 formed in the pocket clip switch 36 and urges the pocket clip switch 36 into biased contact with the casing 30 thereby completing a series electrical circuit between the voltage source 32 and the laser module 26 so as to turn on the laser aiming beam 28. In reverse manner, the aiming beam 28 is turned off by moving the cam switch 118 back to the off position wherein the pocket clip switch 36 is spaced apart and electrically isolated from the casing 30.

FIG. 2A pictures an alternative cam switch arrangement which operates in a manner similar to the manner in which the cam switch illustrated in FIG. 2 operates. For the sake of clarity, certain pointer components shown in FIG. 2 have not been pictured again in FIG. 2A. Components which are used in the alternative arrangement which are similar to previously described components are referred to by the same reference numbers as used in the previous description followed by the suffix A. In FIG. 2A, there is pictured a laser pointer 22A having a normally open miniature button switch 140. This type of switch is available from any one of a number of switch providers such as ITT Cannon Switch Products, Inc. The button switch 140 has normally open first and second poles and is connected to the laser circuit such that the first switch pole communicates with the positive terminal of the laser module and the second switch pole communicates with the positive termination of the voltage source. When the button switch 140 is depressed connecting the first and second switch poles, the laser beam 28 is emitted from the laser pointer 22A. The channel 114A and the cam switch 118A cooperate with the button switch 140 in a manner similar to that which is described above for the laser pointer 22, channel 114 and cam switch 118 and to avoid needless repetition is not described again.

FIG. 3 illustrates an on marker 142, located in the guideway 130, which cooperates with the cam switch 118 such that when the laser pointer 22 is emitting the laser beam 28, the on marker 142 is revealed and when the laser beam 28 is off, the on marker 142 is concealed. The on marker 142 preferably defines a circularly shaped depression wherein there is placed colored material such as, but not limited to, red paint. In its off position, the cam switch 118 covers the on marker 142. Urging the slide element 120 forward from its off to its on position reveals the on marker 142.

Referring again to FIGS. 1, 2 and 3, there is shown a latch element 150 formed in the pointer enclosure 20 for securing the laser pointer 22 therein. It comprises a resilient cantilever arm portion 152, a ramp portion 154 and a latch portion 156. Initial insertion of the laser pointer 22 into the pointer enclosure 20 causes the ramp portion 154 to be deflected by the front face 158 of the pointer thereby permitting the laser pointer 22 to be inserted into the bore 96. Upon full insertion, the cantilever arm 152 returns to its normal position wherein, as shown in FIG. 2, the latch portion 156 is maintained in biased contact against the end cap 88 by the resilient cantilever arm portion 152. Removing the laser pointer 22 is accomplished by the user deflecting the cantilever arm portion 152 such that the latch portion 156 is urged out of engagement with the end cap 88 thus permitting removal of the laser pointer 22 from the pointer enclosure 20.

As shown in FIGS. 1 and 2, there is formed in the pointer enclosure 20 an interlocking female T slot 160 for removably affixing and aligning the pointer enclosure 20 on any one of a number of selected apparatus. As will be explained in more detail below, the female T slot 160 may be used to either affix the pointer enclosure 20 directly on selected apparatus having a mating interlocking male T portion 162 (FIG. 11) formed therein or to affix the pointer enclosure 20 on various support members which have the mating T portion 162 formed on a first end thereof and means formed on a second end for affixing the various support members to selected apparatus.

Figure 4:
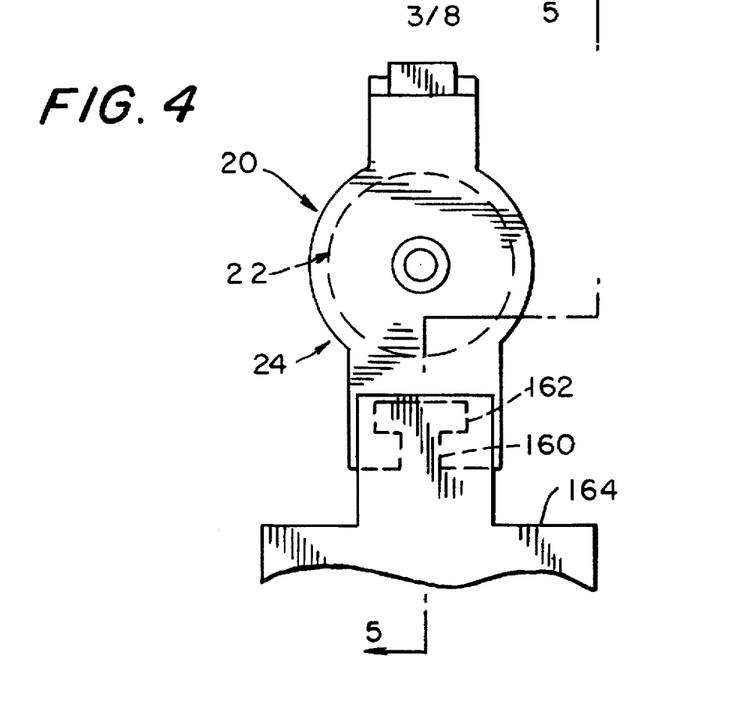
FIG. 4 is a fragmentary front elevation of the pointer enclosure mounted on a typical selected apparatus.
Figure 5:
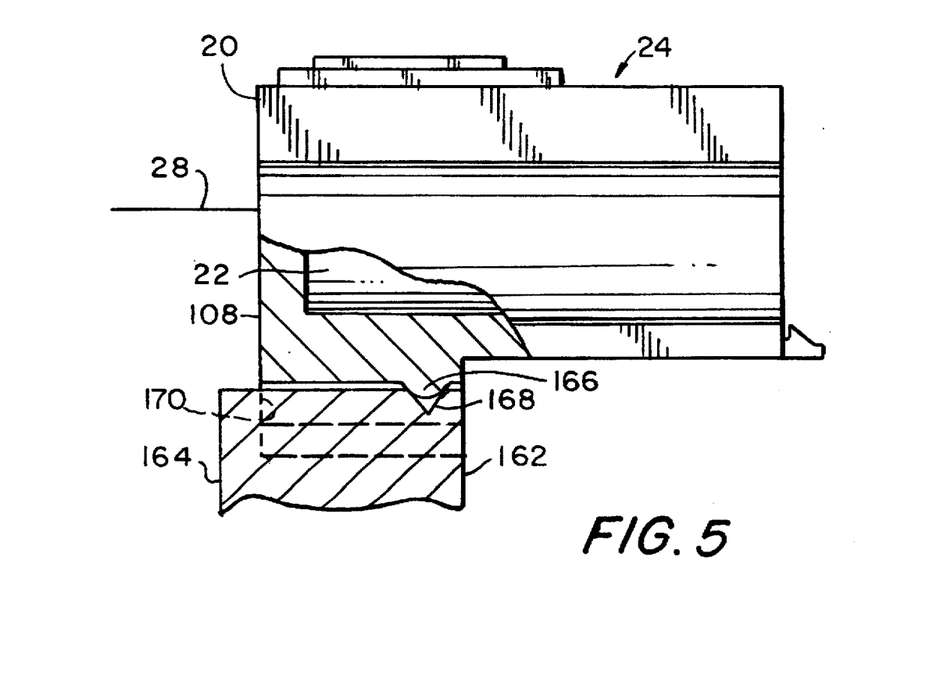
FIG. 5 is a fragmentary sectional view of the pointer enclosure mounted on the typical selected apparatus shown in FIG. 4 taken along the lines 5—5.

FIGS. 4 and 5 illustrate the cooperation of the female T slot 160 with the corresponding male T portion 162. When the male and female T shapes are mated, a detent projection 166 formed in the female T slot 160 engages a V section 168 formed in the male T portion 162 such that the front face 108 of the pointer enclosure 20 is held in biased contact with a bearing surface 170 formed adjacent the male T portion 162. The interlocking of the female T slot 160 and the male T portion 162 removably affixes and aligns with substantial precision the pointer enclosure 20 and the laser beam 28 projected therefrom on a typical selected apparatus 164. FIGS. 4 and 5 illustrate only that portion of the typical selected apparatus 164 upon which the male T portion 162 is formed. The remaining portion (not shown) as described hereinafter, may be either the remaining portion of any one of a number of selected apparatus or the remaining portion of any one of a number of various support members.

Figure 4A:
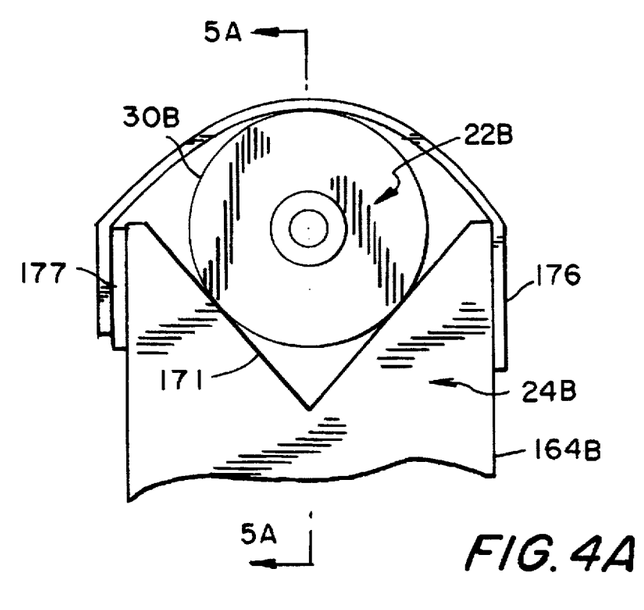
FIG. 4A illustrates an alternate embodiment of the pointer enclosure and the laser pointer shown in FIG. 4.
Figure 5A:
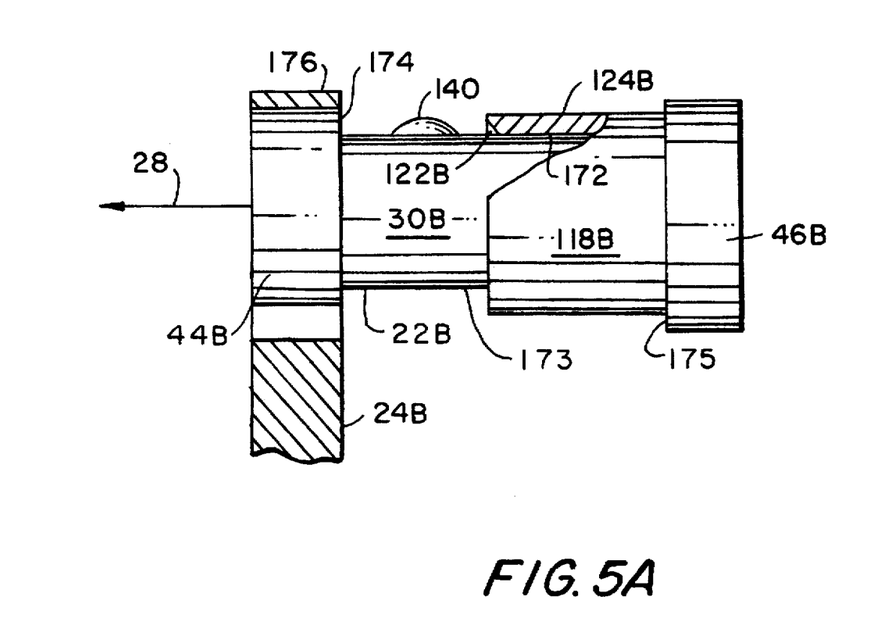
FIG. 5A is a fragmentary sectional view of the adapter shown in FIG. 4A taken along the lines 5A—5A.

FIGS. 4A and 5A show an alternative mounting arrangement to that which is illustrated in FIGS. 4 and 5. For the sake of brevity, certain pointer components shown in FIGS. 4 and 5 have not been pictured again in FIGS. 4A and 5A and components employed in the alternative mounting arrangement which are either similar to or perform similar functions as previously described components are referred to by the same reference numbers used in the previous description followed by the suffix B.

In the embodiment pictured in FIGS. 4A and 5A, an adapter 24B comprises a V groove 171 having mounted therein a laser pointer 22B including the normally open button switch 140 and a sleeve 118B. The button switch 140 cooperates with the laser module 26 and the voltage source 32 in a manner similar to the manner described above and is not described in detail again. When the laser pointer 22B is employed as a hand held device, the normally open button switch 140 is used to control the laser beam 28 and when the laser pointer 22B is affixed to selected apparatus, the user manipulates the sleeve 118B to maintain the button switch 140 in the on position.

The sleeve 118B comprises a serrated outer surface 124B and a cam portion 122B formed on an inner surface 172 which fits slidably on an outer surface 173 of the casing 30B and is constrained thereon between a front lip 174 formed in the body portion 44B and a rear lip 175 formed in the cap portion 46B. By urging the sleeve 118B forward, the user causes the normally open button switch 140 to be depressed and held in its on position.

As is well known in the art, the V groove 171 locates the generally cylindrical casing 30B, and thus the laser beam 28, in substantially precise alignment with respect to the adapter 24B in which the V groove 171 is formed. A first piece 176 of hook and pile affixed to the adapter 24B is drawn tightly across the casing 30B and engages a second piece 177 of hook and pile also attached to the adapter 24B thereby affixing and aligning the laser pointer 22B in the V groove 171. FIGS. 4A and 5A illustrate only that portion of the typical selected apparatus 164B in which the V groove 171 is formed. The remaining portion (not shown) as described hereinafter, may be either the remaining portion of any one of a number of selected apparatus or the remaining portion of any one of a number of various support members.

In FIGS. 6 through 13, various selected apparatus and support members are illustrated. For the sake of clarity, only a fragmentary portion 165 of the pointer enclosure 20 is shown affixed to each of the selected apparatus. The manner in which the pointer enclosure 20 and the elements included therein cooperate with the selected apparatus and/or support members has been previously described. Further, those skilled in the art should recognize that the selected apparatus described in FIGS. 6 through 13 represent only a few of the many selected apparatus upon which the laser housing 20 of the present invention may be mounted.

Figure 6:
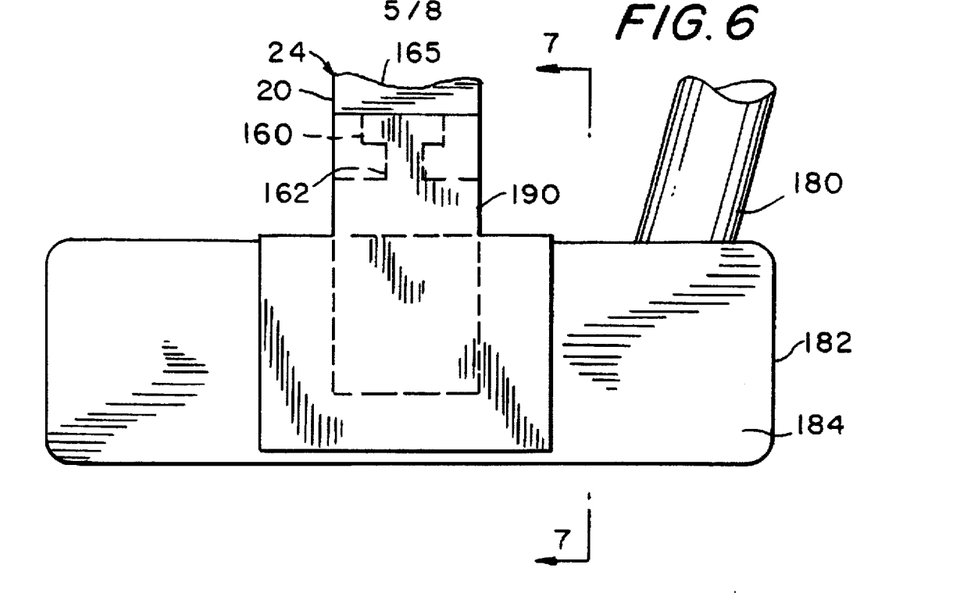
FIG. 6 is a fragmentary front elevation of a first selected apparatus, a golf club, having a first support member mounting the pointer enclosure thereon.
Figure 7:
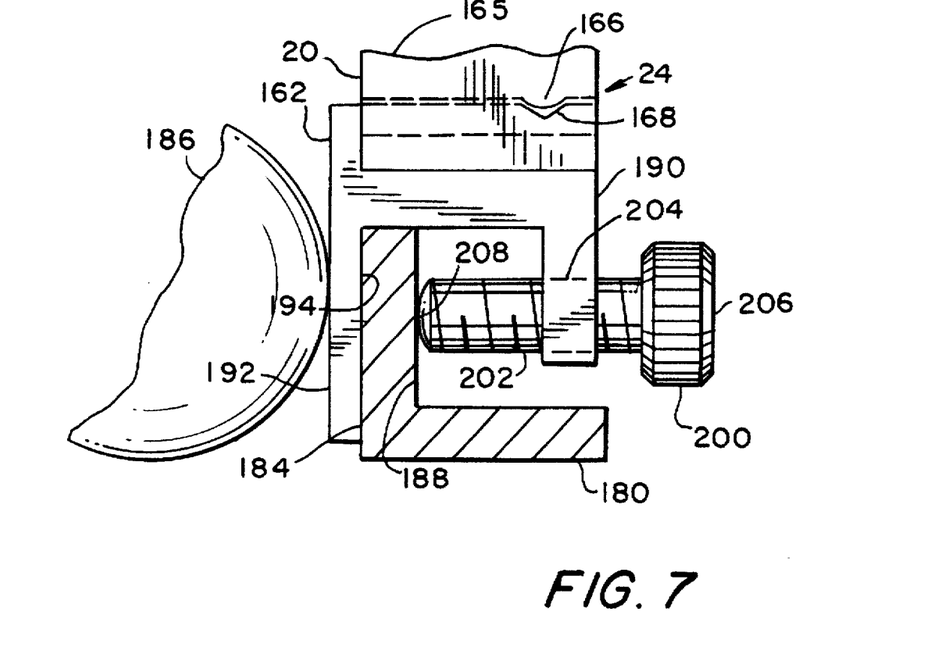
FIG. 7 is a fragmentary sectional view of the first selected apparatus, the golf club, having the first support member mounting the pointer enclosure thereon shown in FIG. 6 taken along the lines 7—7.

FIGS. 6 and 7 illustrate a first selected apparatus 180 which comprises a putter head 182 having a transversely extending generally planar front face 184 for impacting a golf ball 186, and a generally planar rear portion 188 formed substantially parallel to the front face 184 and spaced apart therefrom. A first support member 190 includes the male T portion 162 removably affixing and aligning the pointer enclosure 20 thereon. The first support member 190 may be fabricated using any one of a number of manufacturing processes such as, but not limited to, plastic molding or metal casting. Further, defined by the first support member 190 is at least one tab 192 which engages the front face 184 of the putter head 182 providing a planar reference surface 194 which is perpendicular to the axis 110 (FIG. 2) included in the pointer enclosure 20. A clamp screw 200 having a male threaded section 202 threadedly engages the first support member 190 in which there is a mating female threaded section 204. By rotating a knob 206 which is formed as part of the clamp screw 200, the player tightens the spherical end 208 of the clamp screw 200 against the generally planar rear portion 188. The biased contact of the spherical end 208 against the rear portion 188 urges the planar reference surface 194 against the front face 184 such that the first support member 190 is securely clamped and aligned with respect to the front face 184 thereby ensuring that the laser aiming beam 28 (FIG. 2) emitted from the pointer enclosure 20 is aimed substantially perpendicular to the front face 184. The laser aiming beam 28 may be employed by the user to aim the putter head 182 while practicing golf.

Figure 8:
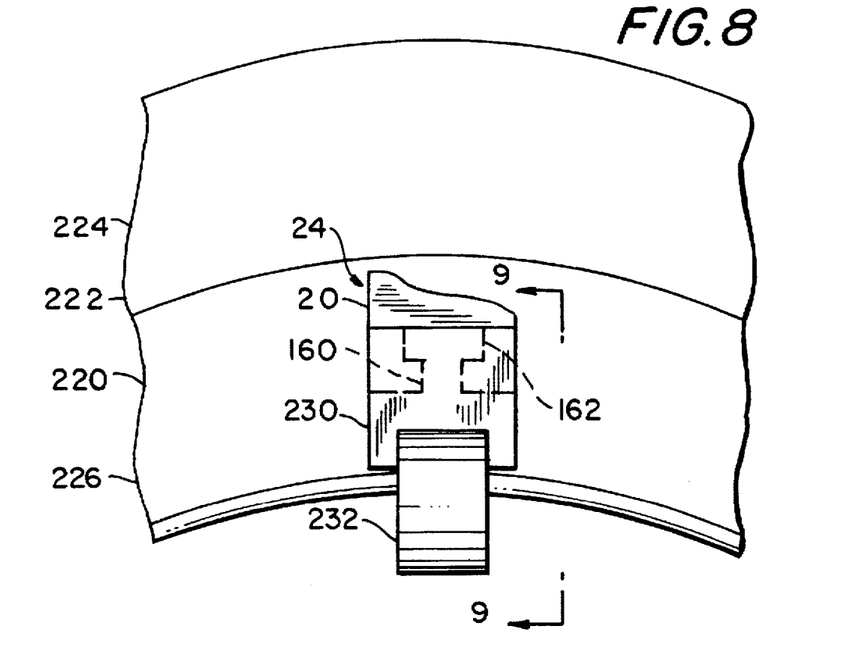
FIG. 8 is a fragmentary front elevation of a second selected apparatus, a golf hat, having a second support member mounting the pointer enclosure thereon.
Figure 9:
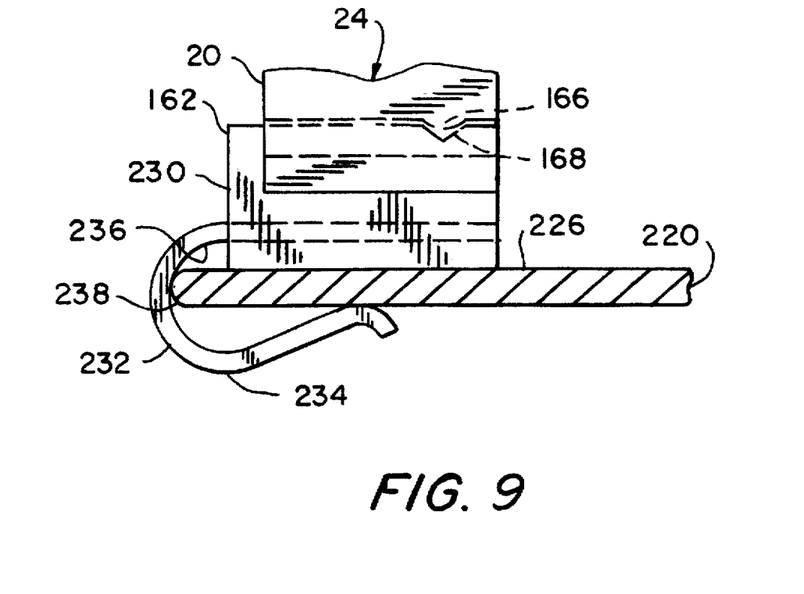
FIG. 9 is a fragmentary sectional view of the second selected apparatus, the golf hat, having the second support member mounting the pointer enclosure thereon shown in FIG. 8 taken along the lines 9—9.

A second selected apparatus 220 is shown in FIGS. 8 and 9 comprising a golf hat 222 having a cap portion 224 and a sun visor portion 226. A second support member 230 having a c-shaped clasp portion 232 which grips the sun visor 226 is used to removably affix the second support member 230 on the sun visor 226 and provides the male T portion 162 upon which to affix the pointer enclosure 20. The second support member 230 may be manufactured by methods similar to those used to manufacture the first support member 190 described above. In addition, the clasp portion 232 includes a resilient spring element 234 adapted to apply a biased force to the sun visor 226 thereby frictionally affixing the second support member 230 to the sun visor 226. The user installs the second support member 230 and associated pointer enclosure 20 on the sun visor 226 by urging the second support member 230 rearwardly so that an inside surface 236 contacts a front edge 238 thereby aligning the second support member 220 and associated pointer enclosure 20 such that the laser aiming beam 28 (FIG.2) emitted therefrom is directed forwardly of the sun visor 226 substantially perpendicular to the front edge 238 thereof. The laser aiming beam 28, used to project a red reference mark on the ground (not shown), may be employed by the user to monitor his or her body motion while practicing the game of golf.

Figure 10:
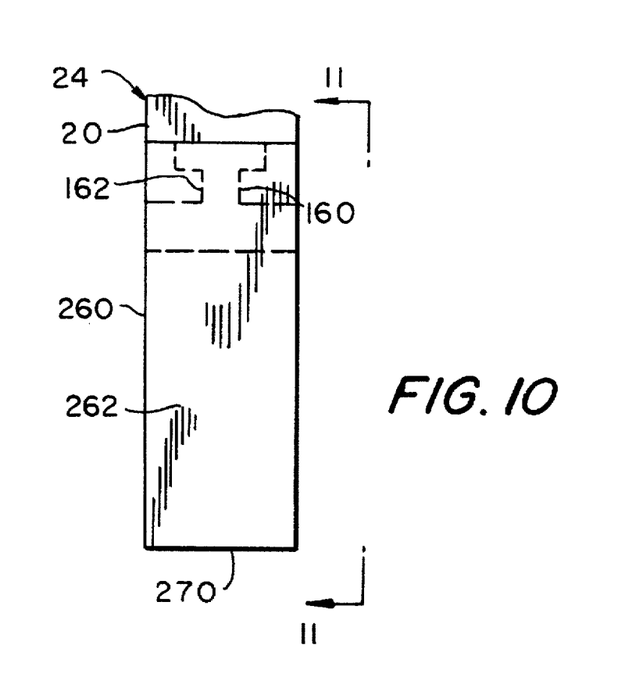
FIG. 10 is a fragmentary front elevation of a third selected apparatus, a level, having the pointer enclosure mounted thereon.
Figure 11:
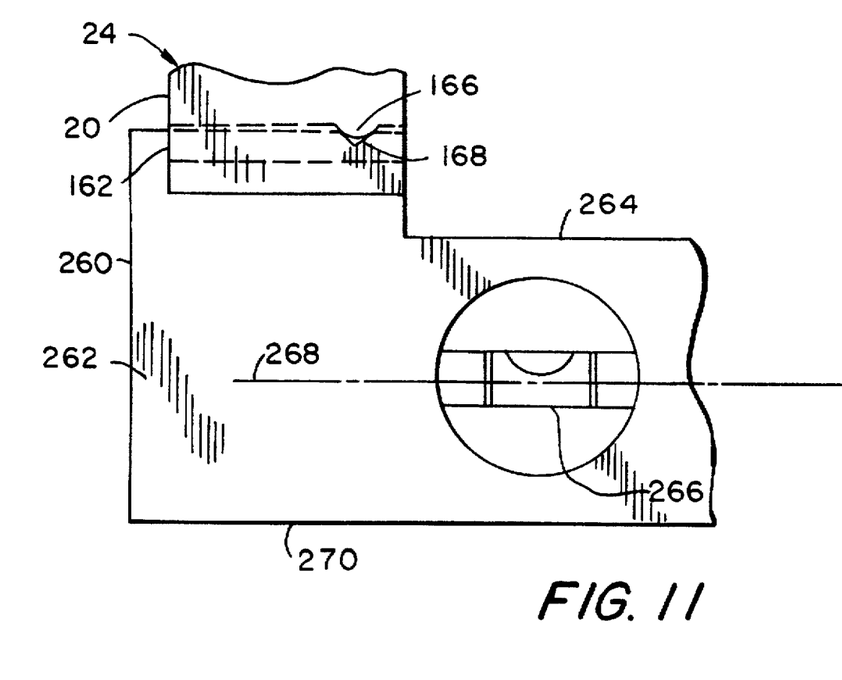
FIG. 11 is a fragmentary sectional view of the third selected apparatus, the level, having the pointer enclosure mounted thereon shown in FIG. 10 taken along the lines 11—11.

FIGS. 10 and 11 illustrate a third selected apparatus 260 comprising a level 262 having a generally rectangular casing 264 and at least one bubble indicator 266 defining a level reference plane 268 parallel to a substantially planar casing surface 270. The level casing 264 may by manufactured by any one of a number of well known processes such as, but not limited to, plastic molding or metal casting wherein the T portion 162 is formed with substantial precision thus providing a means by which to removably affix the pointer enclosure 20 to the level 262 such that the laser aiming beam 28 (FIG.2) emitted therefrom is projected in a substantially precise direction with respect to the planar casing surface 270, preferably parallel thereto. The laser aiming beam 28 may be employed by the user to project a level or plumb reference beam for any one of a wide variety of applications.

Figure 12:
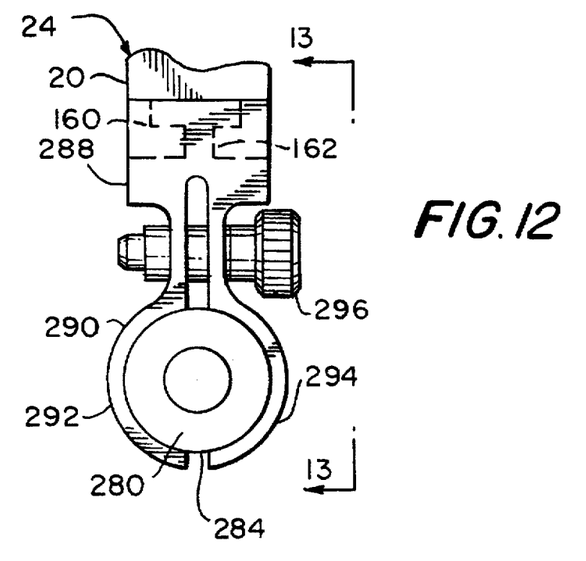
FIG. 12 is a fragmentary front elevation of a fourth selected apparatus, a pool cue, having a fourth support member mounting the pointer enclosure thereon.
Figure 13:
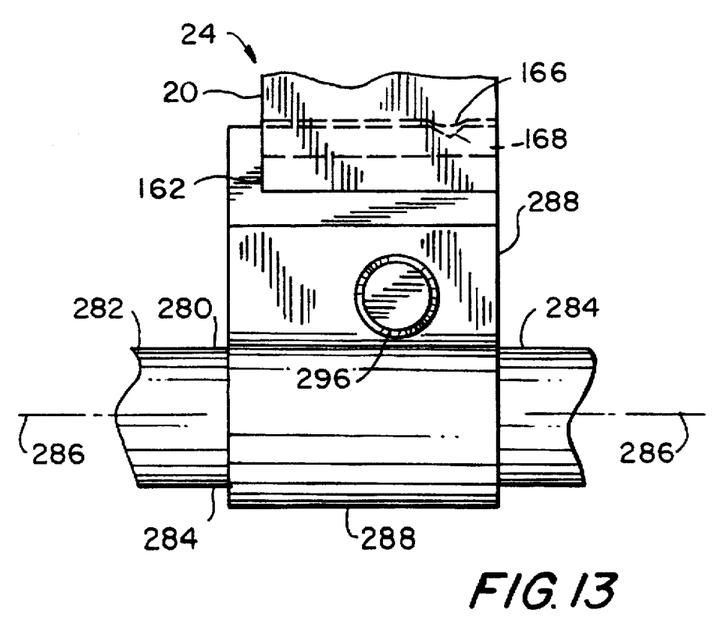
FIG. 13 is a fragmentary sectional view of the fourth selected apparatus, the pool cue, having the fourth support member mounting the pointer enclosure thereon shown in FIG. 12 taken along the lines 13—13.

FIGS. 12 and 13 illustrate a fourth selected apparatus 280 comprising a pool cue 282 having a generally cylindrical shaft 284 defining a shaft axis 286. A fourth support member 288 comprises a clamp section 290 having a first side 292 and a second side 294 wherein each side is adapted to grip the shaft 284, a clamp screw 296 and the T portion 162. Manufacturing processes, as described above for the fabrication of the first support member 190, may be employed to form the fourth support member 288 which is affixed to the pool cue 282 by tightening the clamp screw 296 thereby urging the first 292 and second 294 sides into biased contact with the generally cylindrical shaft 284. The pointer enclosure 20 is removably affixed to the T portion 162 of the fourth support member 288 such that the laser aiming beam 28 (FIG.2) emitted therefrom is projected in a substantially parallel direction with respect to the axis 286 of the pool cue 282. The laser aiming beam 28 may be employed by the user to aim the pool cue 282 while practicing the game of pool.

It is also to be understood that the present invention is not limited to the precise details of structure shown and set forth in this specification for obvious modifications will occur to those skilled in the art to which the invention pertains.

What is claimed is:

1. A laser aiming device projecting an alignment beam, said laser device comprising: a hand held laser pointer including a laser module emitting a laser beam, a casing, a power source, and a normally open switch having an on position and an off position controlling said laser module, such that a sustained force is required to maintain said switch in an on position; an adapter on which said laser pointer is removably affixed; means for maintaining said laser pointer in said on position on said adapter; and means for affixing said adapter on selected apparatus such that when said laser pointer is installed on said adapter, said laser beam emitted therefrom is projected in a predetermined relation with respect to said selected apparatus.

2. A laser aiming device in accordance with claim 1 wherein said adapter comprises a pointer enclosure defining a bore for receiving said casing therein.

3. A laser aiming device in accordance with claim 2 wherein said pointer enclosure further comprises a latch element positioned in biased contact against said casing to retain said pointer in said pointer enclosure.

4. A laser aiming device in accordance with claim 2 wherein said casing further comprises a generally cylindrical outer surface having a laser warning label affixed thereto; said adapter having a bore in which said laser pointer is positioned; said bore including an enlarged portion adapted to surround said label without misaligning said laser module.

5. A laser aiming device in accordance with claim 4 wherein said outer surface defines a first section fitting snugly in said bore contacting an inside surface thereof and a second section formed to receive said label thereon such that when said label is affixed thereto and said casing is installed in said bore, said label does not contact said inside surface of said bore.

6. A laser aiming device in accordance with claim 4 wherein said pointer enclosure comprises a first bore section formed to receive and align said casing therein and a second bore section formed such that when said casing is installed in said bore, said warning label does not contact said second bore section.

7. A laser aiming device in accordance with claim 1 wherein said laser module includes first and second conductive means coupling opposite polarity potentials including a first pole and a second pole, respectively, from said voltage source to said laser module to cause said laser module to emit said laser beam; said second conductive means and said second pole being insulated from said casing wherein said second pole and said second conductive means are electrically connected.

8. A laser aiming device in accordance with claim 7 wherein said normally open switch comprises an electrically conductive pocket clip communicating with said first pole and being normally spaced apart from said first conductive means whereby operating said clip electrically connects said clip to said first conductive means turning on said laser module.

9. A laser aiming device in accordance with claim 7 wherein said normally open switch comprises a button switch having normally spaced apart first and second switch poles communicating with said first conductive means and said first pole, respectively, whereby operating said button switch electrically connects said first switch pole to said second switch pole turning on said laser module.

10. A laser aiming device in accordance with claim 1 wherein said normally open switch includes a cam positioned in said housing adjacent said normally open switch, said cam comprising a movable element defining a cam surface, said normally open switch being activated by urging said cam surface into engagement therewith such that said normally open switch is operated from said off to said on position.

11. A laser aiming device in accordance with claim 10 wherein said cam switch further comprises an on marker which is concealed when said normally open switch is in said off position and revealed when said normally open switch is in said on position.

12. A laser aiming device in accordance with claim 10 wherein said pointer enclosure includes a channel communicating with said bore, said channel defining a cavity within which said cam switch cooperates with said normally open switch.

13. A laser aiming device in accordance with claim 12 wherein a portion of said normally open switch extends into said cavity thereby aligning said normally open switch with respect to said cam.

14. A laser aiming device in accordance with claim 1 wherein said selected apparatus comprises said adapter.

15. A laser device projecting an alignment beam, said laser device comprising:

a hand held laser pointer including a laser module emitting a laser beam, a casing, a power source and a normally open switch having an on position and an off position controlling said laser module;

a pointer enclosure having a bore in which said laser pointer is removably affixed such that said laser beam is emitted through an opening in said bore;

means on said enclosure for maintaining said laser pointer in said on position;

a support member forming first and second alignment means;

said first alignment means affixing and aligning said support member on selected apparatus, said second alignment means removably affixing and aligning said pointer enclosure on said support member; and said pointer enclosure and said support member being mutually aligned such that when said pointer is installed in said pointer enclosure, said laser beam emitted therefrom is aimed in a predetermined relation with respect to said selected apparatus.

* * * * *